Aug. 17, 1965  W. K. NOONAN ETAL  3,201,186
AUTOMOBILE LUGGAGE CARRIER AND TABLE
Filed Sept. 18, 1963  2 Sheets-Sheet 1

INVENTORS
JOHN PREMI
WALTER K. NOONAN
BY: Featherstonhaugh & Co.
ATTORNEYS

Aug. 17, 1965   W. K. NOONAN ETAL   3,201,186
AUTOMOBILE LUGGAGE CARRIER AND TABLE
Filed Sept. 18, 1963   2 Sheets-Sheet 2

INVENTORS
JOHN PREMI
WALTER K. NOONAN
BY: Fetherstonhaugh & Co.
ATTORNEYS

United States Patent Office 3,201,186
Patented Aug. 17, 1965

3,201,186
AUTOMOBILE LUGGAGE CARRIER
AND TABLE
Walter K. Noonan, 2083 Rebecca St., Oakville, Ontario,
Canada, and John Premi, 819 Garth St., Hamilton,
Ontario, Canada
Filed Sept. 18, 1963, Ser. No. 309,791
6 Claims. (Cl. 312—241)

This invention relates to improvements in luggage carriers for automobiles and is particularly directed to the type of luggage carrier normally supported for transportation upon the roof of an automobile body.

The object of the invention is to provide a folding luggage carrier which in addition to providing a chest for reception of luggage when in position upon an automobile body, may also when removed from the body, be unfolded to provide a sturdy table and cupboard, a prop which constitutes the table legs also having associated therewith means for attaching the prop, and thereby the chest and table top, to the top surface of the automobile body, the prop spacing the bottom surface of the chest from the automobile body top surface to accommodate the usual curvature of the latter.

Another object of the invention is to provide such a carrier wherein the luggage chest is provided with a closure lid, the lid being so arranged that it may be closed in the normal manner, or in cases wherein the quantity of luggage bulges above the open top of the chest be swung into an "out of the way" position underneath the chest.

Further objects and advantages of the invention will be apparent from the following description taken in conjunction with the accompanying drawings, in which.

Figure 5:
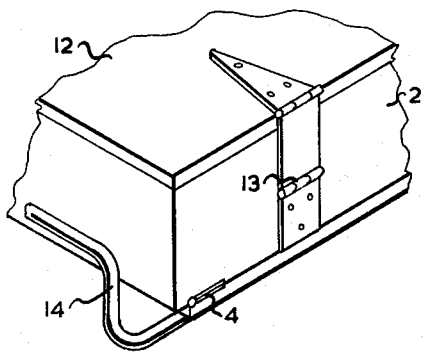
FIG. 5 is an enlarged fragmentary view of one corner of the chest, as in position mounted upon an automobile, and showing a lid forming a closure for the open top of the chest.
Figure 6:
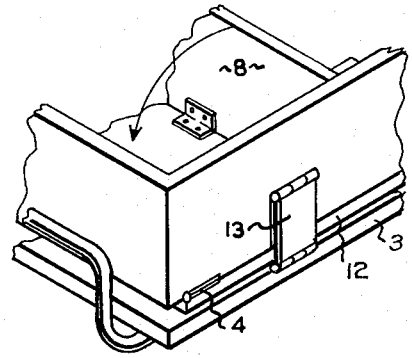
Figure 7:
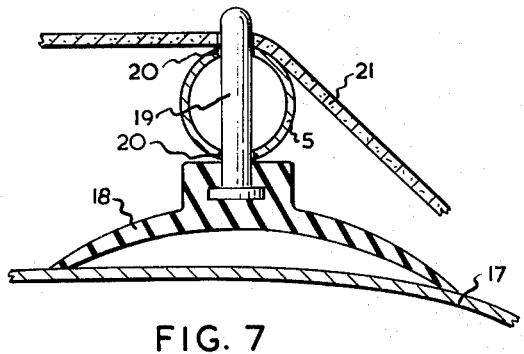

FIG. 6 is a similar view to FIG. 5 and showing the top of the chest open and the lid positioned underneath the chest, and FIG. 7 is a further enlarged vertical cross-sectional detail through a fragmentary portion of the roof of an automobile body carrying a suction cup provided with a pin inserted through an orifice in the leg of a strut furnished for support of the table top, together with portion of a strap for securing the folded carrier assembly in place upon the automobile body roof.

The novel combined luggage carrier and table herein disclosed and arranged for transportation upon the top of an automobile body, consists of three main elements comprising a rectangular chest 2, a table top 3 having one of its ends attached by hinges 4 to one end of the bottom or back face of the chest, and a table top supporting prop of U-shaped form and comprising a pair of legs 5 extending from the ends of a transverse strut 6, the free ends of the legs being attached by hinges 7 to the opposite end of the table top.

Figure 1:
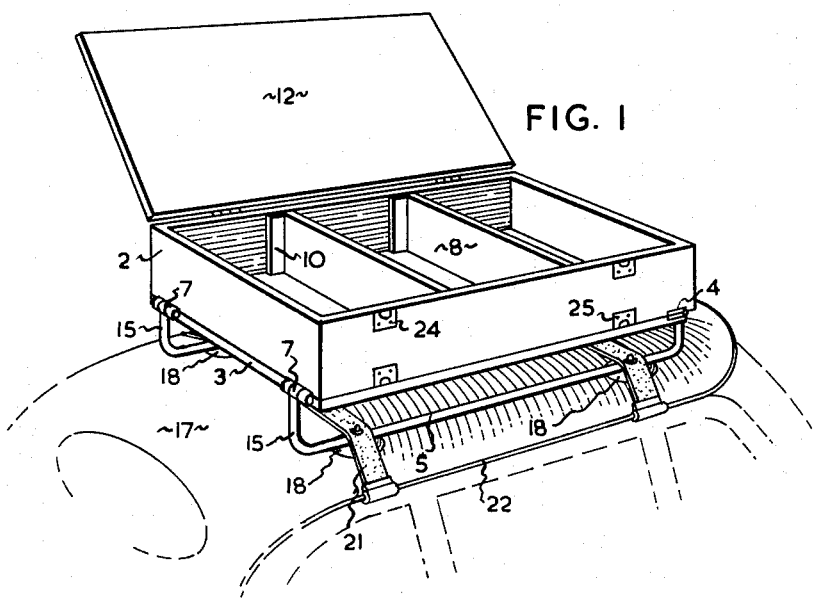
FIG. 1 is a perspective view showing the top of an automobile having a combined luggage chest and table, constructed in accordance with the invention, mounted thereon.

For transportation, the table top and its supporting strut are folded underneath the chest as shown in FIG. 1. In transforming the chest and table top into a cupboard supporting an adjacent table, the assembly is unfolded in the manner shown in FIGS. 3 and 4 to provide the erected arrangement illustrated in FIG. 2.

The chest 2 is preferably furnished with several shelves 8 to facilitate its use as a cupboard, such shelves being hingedly secured to the inner face of the back or bottom 9 of the chest, so that for luggage transportation they may be folded back to rest against the bottom of the chest, as indicated by the arrow in FIG. 6. When unfolded, the shelves are supported by blocks 10 mounted upon the inner faces of the sides of the chest.

The chest is provided with a lid 12 carried upon a pair of double T-hinges 13 secured to the outer face of one side of the chest the hinges being dimensioned and arranged to permit the lid to be swung from the chest closing position shown in FIG. 5 to a position underlying the bottom 9 of the chest, as shown in FIG. 6. The object of this arrangement is to meet situations wherein luggage to be transported is of greater height than the depth of the chest. In which case, the lid of the chest is swung into position underlying the chest, as shown in FIG. 6, luggage carried in the chest and protruding upwardly therefrom being secured by straps (not shown) which take the place of the lid for retaining the luggage in place within the chest.

Figure 3:
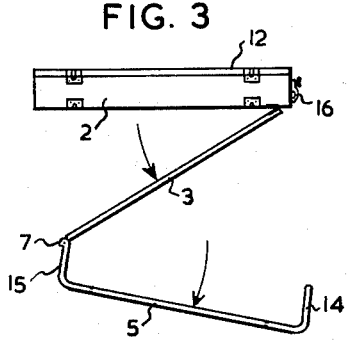
FIG. 3 is a side elevational view of the chest and table in a partly unfolded position.
Figure 4:
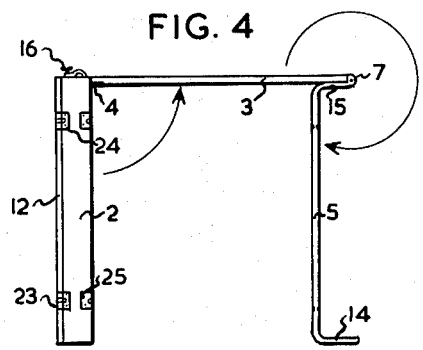
FIG. 4 is a similar view to FIG. 3 showing the chest and table completely unfolded.

To accommodate the assembly for placement upon the transverse curvature of an automobile body roof, the leg juncture portions 14 between the leg central portions and the strut 6 and the leg juncture portions 15 between leg central portions and the hinges 7 are bent upwardly, referring to FIGS. 1 and 3, to provide an arrangement wherein the two corresponding central leg portions, when in the folded horizontal position, as shown in FIG. 1, are spaced downwardly of the bottom of the chest. As the legs 5 support the folded assembly, the bottom of the chest 2 is spaced above the body roof. When the assembly is unfolded, as shown in FIG. 4, the juncture portions 15 underlie and support the table top. When the assembly is folded, the strut 6 engages and is held in position by a spring clip 16 mounted upon the top end face of the chest.

To secure the assembly in place upon an automobile body roof 17, four suction cups 18 are suitably positioned upon the roof. The suction cups are provided to carry vertically protruding pins 19 receivable within orifices 20 in the legs 5, as shown in FIG. 7. When the folded assembly is placed in position upon the top of the body, the pins 19 within the orifices 20 retain the assembly against sliding movement. For retention of the assembly against upward movement, usual type straps 21 attachable to the body troughs 22 are employed, the straps extending over the legs 5.

Figure 2:
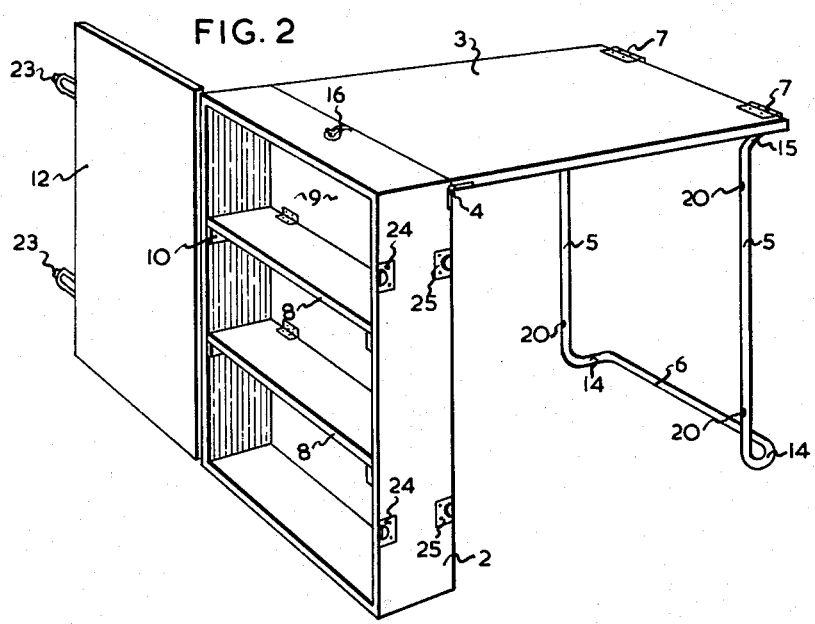
FIG. 2 is an enlarged perspective view of the combined luggage chest and table removed from the automobile and unfolded and erected for use, and wherein the chest provides support for one end of the table top.

Upon reference to FIG. 2 it will be appreciated that the invention provides a very acceptable piece of camping furniture wherein the horizontal luggage carrying roof chest is convertable into an upright cupboard and which functions as a sturdy support for one end of a table top, the strut supporting the other end of the table top also functioning as a support permitting the folded assembly to be accommodated to the curved roof of an automobile body.

Though possible changes may be made in constructional details of the invention, it is to be understood that any such changes may be made without departing from the scope of our invention, as defined in the appended claims.

What we claim as our invention is:

1. A combined luggage carrier and table top for mounting upon the top surface of an automobile body, comprising, in combination a rigid chest constituting a luggage receiving receptable, a table top hingedly attached at one of its ends to the said chest and selectively swingable from a position extending in parallel relation to the chest to a position extending in right angle relation to the chest, and a table top supporting prop hingedly attached at one of its ends to the end of the table top remote from the table top's attachment to the said chest, the prop comprising a pair of legs spaced from one another and selectively swingable from a position in which the legs extend in parallel relation to the table top to a position in which they extend in right angle relation to the table top, said prop when extending in parallel relation to said chest being in a position underlying the chest with corresponding portions of the legs spaced from the said chest, and means associated with the said corresponding portions of the prop legs for attaching the underlying prop and thereby the chest and table top to the top surface of an automobile body.

2. The combination as defined in claim 1, wherein the chest when mounted upon the top surface of an automobile body presents an open top, and comprising a lid for closing said open top and hinge means connecting an edge of said lid to a side of the chest, whereby said lid is selectively swingable from a position forming a closure for the open top of the chest to a position underlying the chest.

3. The combination as defined in claim 1, wherein the prop is of U-shaped form comprising the said pair of table legs extending from the ends of a transverse strut, the free ends of the legs being hingedly attached to the table top and formed with inturned portions adapted to space the said corresponding portions of the prop legs from the chest and also adapted to underlie and support the table top when the prop is in position extending in right angle relation to the table top.

4. The combination as defined in claim 1, wherein the prop is of U-shaped form comprising the said pair of table legs extending from the ends of a transverse strut, the free ends of the legs being hingedly attached to the table top and formed with inturned portions adapted to space the said corresponding portions of the prop legs from the chest and also adapted to underlie and support the table top when the prop is in position extending in right angle relation to the table top, and wherein the chest when mounted upon the top surface of an automobile body presents an open top, the combination also comprising a lid for closing said open top and hinge means connecting an edge of said lid to a side of the chest, whereby said lid is selectively swingable from a position forming a closure for the open top of the chest to a position underlying the chest.

5. The combination as defined in claim 1, wherein the prop is of U-shaped form comprising the said pair of table legs and a transverse strut, outwardly bent juncture portions extending between the bottom ends of the legs and the ends of the strut, outwardly bent juncture portions extending from the upper ends of the legs to hinges attached to an end of the table top, the portions of the legs between the juncture portions constituting the said corresponding portions thereof and the juncture portions spacing the said corresponding portions from the table top when the legs are in position extending in parallel relation to the table top.

6. A combined luggage carrier and table top for mounting upon the top surface of an automobile body, comprising in combination, a rigid chest constituting a luggage receiving receptacle, a table top hingedly attached at one of its ends to the said chest and selectively swingable from a position extending in parallel relation to the chest to a position extending in right angle relation to the chest, and a table top supporting prop hingedly attached at one of its ends to the end of the table top remote from the table top's attachment to the said chest, the prop comprising a pair of legs spaced from one another and selectively swingable from a position in which the legs extend in parallel relation to the table top to a position in which they extend in right angle relation to the table top, the said prop then extending in parallel relation to said chest being in a position underlying the chest, and means associated with the said prop legs for attaching the prop when in said underlying position, and thereby the chest and the table top, to the top surface of an automobile body with the chest spaced from the said top surface of the automobile body.

References Cited by the Examiner
UNITED STATES PATENTS

| 1,570,350 | 1/26 | Howell | 312—195 X |
| 2,695,826 | 11/54 | Henle | 108—18 |
| 2,715,053 | 8/55 | Wiegel | 190—12 |

FOREIGN PATENTS

| 169,119 | 2/51 | Austria. |
| 251,852 | 11/47 | Switzerland. |

FRANK B. SHERRY, *Primary Examiner.*

CHANCELLOR E. HARRIS, *Examiner.*